July 12, 1966  S. KATZ  3,260,271
SPEED SENSOR AND REGULATOR FOR PRIME MOVERS
Filed March 27, 1963  2 Sheets-Sheet 1

INVENTOR,
SILAS KATZ
BY Harry M. Saragovitz,
Edward J. Kelly,
Herbert Berl &
R. C. Lucke July 12, 1966     S. KATZ     3,260,271
SPEED SENSOR AND REGULATOR FOR PRIME MOVERS
Filed March 27, 1963     3 Sheets-Sheet 2
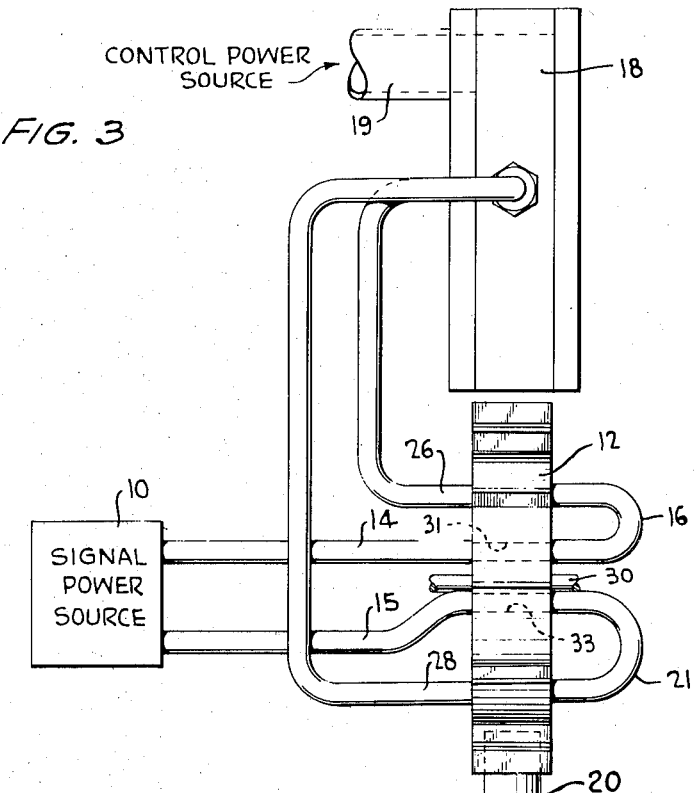
FIG. 3
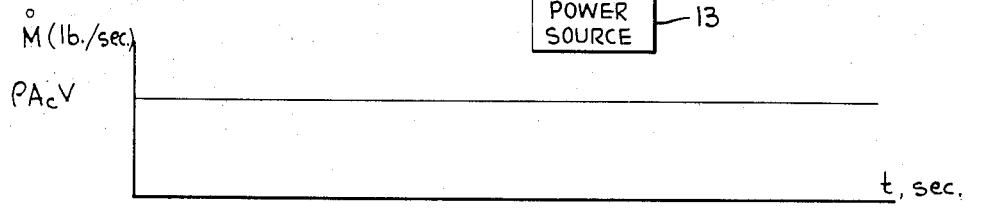
FIG. 4
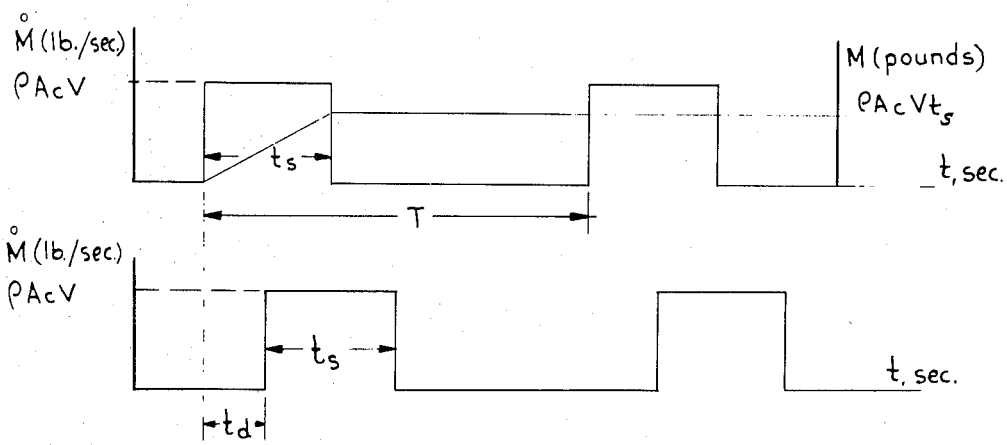

United States Patent Office 3,260,271
Patented July 12, 1966

3,260,271
SPEED SENSOR AND REGULATOR FOR PRIME MOVERS
Silas Katz, Silver Spring, Md., assignor to the United States of America as represented by the Secretary of the Army
Filed Mar. 27, 1963, Ser. No. 268,504
5 Claims. (Cl. 137—36)

The invention described herein may be manufactured and used by or for the Government of the United States of America for governmental purposes without the payment to me of any royalty thereon.

This invention relates to on-off discontinuous control devices and, more particularly, to a fluid-operated angular velocity sensor and regulator.

The importance of velocity regulation for turbine and other high velocity rotating devices has long been recognized. Present day velocity regulators have moving parts, such as fly weights, springs and valves, and precise angular velocity control has been encumbered by the inertial delays which are inherent in such apparatus. These devices were limited by the response time and life characteristics of electrical and mechanical relays. With the invention of this disclosure, the regulating of angular velocity and rapid response to deviations from this desired velocity enables a more precise control than was obtainable in the prior devices of this art.

The velocity sensor and regulator of this invention includes a fluid amplifier and a sensing means having an element which provides a signal which is indicative of the angular velocity of a driven element, such as a turbine, pneumatic transmission line for passing the signal and means for applying the signal as a control signal to the fluid amplifier. The fluid amplifier, in turn, is effective to adjust the angular velocity of the turbine in response to the signal received. The operational frequency of cycling is much higher than previously accomplished. The life characteristics are practically limitless.

It is, therefore, an object of this invention to provide a precise angular velocity control means.

Another object of this invention is to provide a device for providing a constant angular velocity.

Still another object of this invention is to provide an angular velocity regulator device making use of a fluid amplifier.

It is a further object of this invention to provide an angular velocity regulator employing a fluid sensor of angular velocity.

It is a still further object of this invention to provide an angular velocity speed regulator employing the principles of a fluid amplifier and of a fluid sensor.

It is a still further object of this invention to provide an angular velocity regulator which has no moving parts nor any elaborate electronic servo equipment.

Another object of this invention is to provide an angular velocity regulator which enables precise velocity regulation with a fluid amplifier and a fluid sensor device.

A further object of this invention is to provide a control device utilizing devices of very high power gain.

A still further object of this invention is to provide an on-off discontinuous control device in which the operational frequency of cycling is substantially higher than previously obtainable.

Another object of this invention is to provide an on-off discontinuous control device in which the life characteristics are practically limitless.

The specific nature of the invention, as well as other objects, uses and advantages thereof, will clearly appear from the following description and from the accompanying drawing, in which:

FIG. 3 is a side view of the embodiment shown in FIG. 2.

FIG. 4 is a graphic representation of the operation of the device of this invention.

Figure 1:
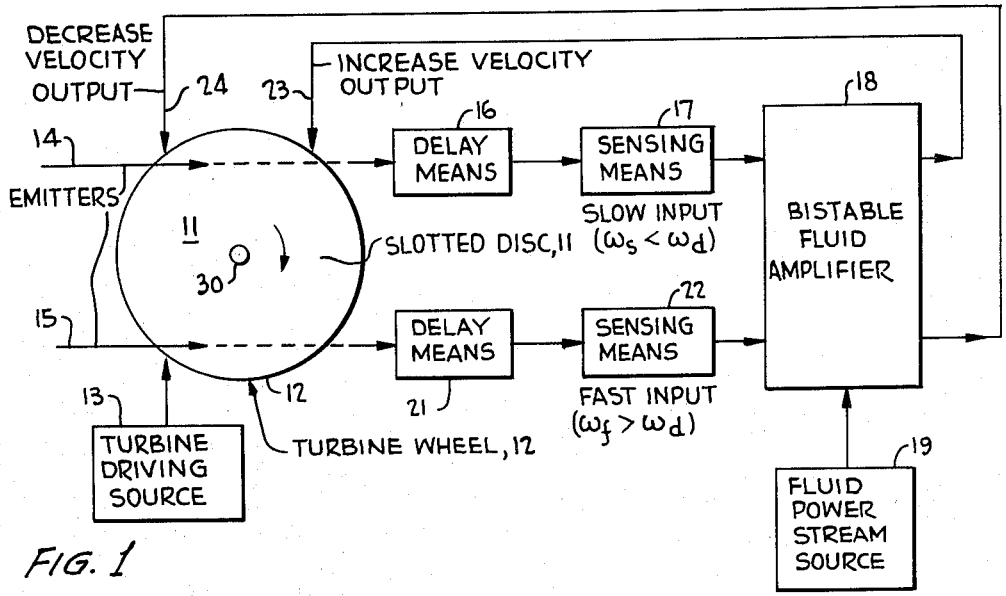
FIG. 1 shows this invention in block diagram form.

Briefly, the pneumatic angular velocity regulator and sensor of this invention includes a pair of emitters, a pair of collectors with a pair of delay lines and a rotatable slotted disc for determining the distribution of fluid signals through the emitters, the delay lines and the collectors. The slotted disc is positively coupled to a wheel the velocity of which is to be maintained at a constant rate. This wheel can be a turbine with the slotted disc as its inner structure or the slotted disc and the turbine can be separate units which are rigidly coupled together when the need of displacement of the two with respect to each other arises. In operation, continuous streams of air emanate from the emitters and, such streams are transmitted to the delay lines only when an opening in the disc is properly aligned with a first one of the emitters. Upon proper alignment, a fluid pulse will pass through the delay line and will be available at the slotted disc so as to pass through a slot on the disc to enter one of the collectors should the disc be turning too rapidly, for example. In such a case, the fluid pulse will go through a collector to a control nozzle on the fluid amplifier and cause said fluid amplifier to switch so as to present its power stream as a retarding force on the turbine. In the event that the slotted disc presents solid material to the fluid pulse and not an open slot, the angular velocity of the disc is, therefore, not above the desired angular velocity and no change is made in the speed regulation of the turbine. The second emitter is arranged so that when an opening in the disc is aligned therewith, a fluid pulse is introduced into the second delay line and travels until it reaches the position that is aligned with the second collector on the opposite side of the slotted disc. Upon the arrival of the fluid pulse at this second collector position, in the event that a slot is positioned so as to coincide with the arrival of the fluid pulse to permit the fluid pulse to pass through to the second collector, the fluid pulse will pass from the second collector to the other control nozzle of the fluid amplifier to switch the amplifier so that its power stream will flow in a direction to increase the velocity of the turbine, and thereby re-establish the desired angular velocity. Had the fluid pulse arrived at the slotted disc at a time that solid material was presented instead of the slot, no signal would go through to the second collector and the fluid amplifier would not be switched, thereby indicating that the velocity of the turbine was not too slow. This device senses variation in angular velocity and provides a correcting torque when the velocity varies from a desired angular velocity or set point. If a single disc is used, each corrective signal passes through the disc two times. That is, when the signal from an emitter enters a hole in the disc being the first time and when the signal returns from the delay line and enters the corresponding slot to be available to a collector being the second time. When two discs are used, the signals pass once through each disc. The emitter is positioned to present signals to a hole in the first disc, and the delay line is connected between the two discs performing as the collector of the signals through the hole and as an emitter for the signals to the second disc to pass through to the collector to the fluid amplifier.

Turning now to the drawings in which like parts have the same numerals throughout the several views, FIG. 1 shows in block diagram the elements of the system of this invention. The slotted disc 11 is illustrated as being combined with a turbine 12 and as being mounted to rotate about the center thereof. A power driving source 13 is directed toward the turbine 12 to give angular velocity thereto. Power source 13 can be by the expansion of a gas in a cylinder, by electrical means, by internal combustion engines or the like. First and second emitters 14 and 15, respectively, are provided to direct control fluid pulses toward pre-selected slots in the slotted disc 11. The fluid pressure in the emitters is constant and continuous. In the flow stream of the first emitter 14 is a delay means 16 which receives a fluid pulse from emitter 14 when a hole in disc 11 is periodically aligned therebetween. The output of the delay means 16 is applied to a first sensing means 17 which determines if the fluid pulse received from the emitter 14 is, for example, unduly delayed in arriving at the sensing means 17. If the fluid pulse is unduly delayed, the sensing means 17 will provide an output which is connected to a control nozzle of the fluid amplifier 18 to enable the bi-stable fluid amplifier 18 to redirect its power stream output so as to issue a supplemental power stream through output 23 to the turbine 12 to increase its angular velocity. The outputs 23 and 24 of the fluid amplifier 18 provide corrective action directly to the turbine or rotating device or to an intermediate control element in cases where the fluid amplifier outputs are ineffective to regulate the velocity.

The second emitter 15 is aligned with a second delay means 21 in such a manner that the position of a hole in the slotted disc 11 will provide a fluid pulse through the delay means 21 to a fast speed sensing means 22. In the event that turbine 12 is operating at an angular velocity higher than desired, sensing means 22 will provide an output pulse to the second of the control nozzles of the bi-stable fluid amplifier 18 to cause the power stream in the fluid amplifier to change to a receiver which will provide an output power stream from output 24 that is effective to retard the velocity of the turbine 12. The sensing means 17 and 22 operate in such a manner as to substantially constantly provide a signal to switch the bi-stable fluid amplifier 18. That is, constantly except during the time required for the turbine to come up to the desired velocity, in which case the sensing means 17 is alone providing an increase velocity control signal to the bi-stable fluid amplifier. Also, constantly with the further exception of the time when the angular velocity of the turbine is exactly as desired and no output is available from either of the sensing means 17 or 22. A retarding or a increasing force is still being applied by the output of the fluid amplifier and this second exception is merely a transient condition. This exact velocity is present in the company of alternate slightly higher and slightly lower than desired velocities. The angular velocity is held well within two percent of a desired value.

Figure 2:
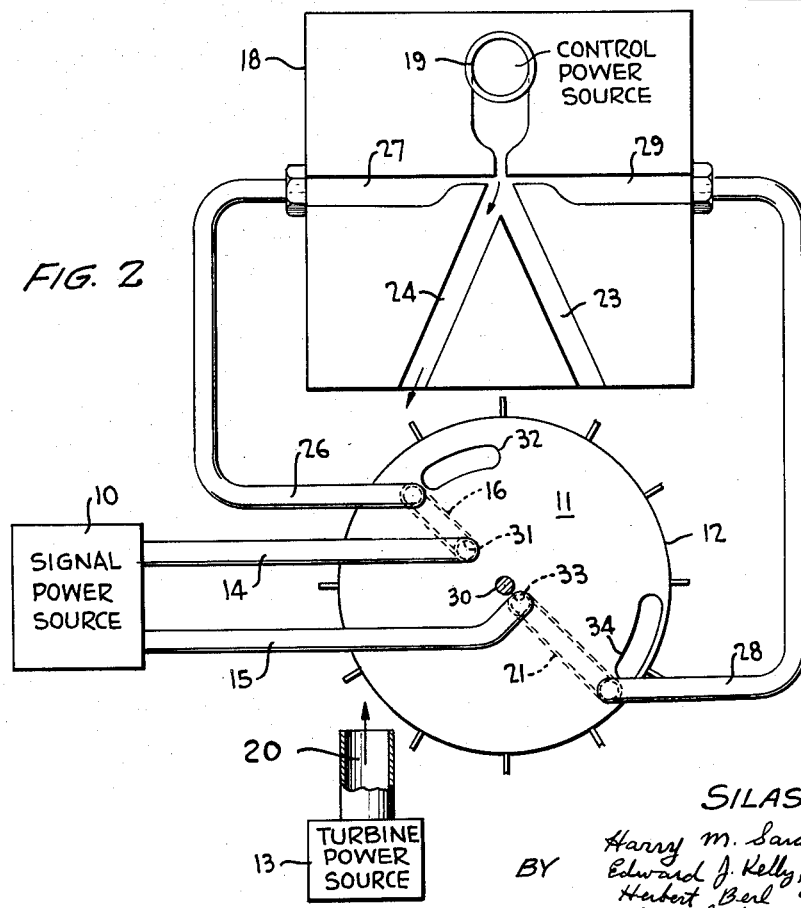
FIG. 2 is a front view of an embodiment of this invention.

FIG. 2 shows an embodiment of this invention pictorially with the like elements shown in FIG. 1 having like numbering.

FIG. 2 shows what could be considered to be a front view of an embodiment of this invention. With a constant signal power source providing control signals through emitters 14 and 15, the slotted disc 11 is rotated by the turbine driving fluid force from source 13 through conductor 20 which is directed toward the buckets of turbine 12. Disc 11 is provided with passageways therethrough such as a hole 31 one end of which is aligned with one end of emitter 14 and the other end of which is aligned with one end of collector 16. The length of collector 16 is determined by the amount of delay desired to be introduced. The longer the collector, the more time required for the control signal to pass through the collector and arrive at its other end. This other end is aligned with a slot 32 through disc 11. Slot 32 is shaped and positioned in such a manner that, when the turbine 12 is operating at the desired angular velocity, the fluid pulse that hole 31 introduced into the collector 16 will arrive back at the disc just after slot 32 passes between the axially aligned collector 16 and the control line 26. When turbine 12 is operating at an angular velocity slightly less than desired, slot 32 would then be in position to coincide with the arrival of the delayed signal from collector 16. The delayed signal would pass through slot 32 in the disc into the control line 26. The delayed signal then passes through the control line 26 into the left control nozzle 27 of the fluid amplifier 18 with the result of switching the control power stream into the fluid amplifier receiver 23 and onto the buckets of turbine 12 to add to the driving forces on the turbine 12 thereby increasing its angular velocity.

Included in the bi-stable fluid amplifier 18 are a control power source 19 of sufficient magnitude to effect the desired velocity changes for the turbine 12. The power stream is applied through a power nozzle into an interaction chamber bounded by the side walls of a right receiver 23 and a left receiver 24 which are channels for the power stream to leave the interaction chamber. Perpendicularly disposed with respect to the issuing end of the power nozzle are the right control nozzle 29 and the left control nozzle 27. The control nozzles have the same axis and are directed towards each other. Due to the wall lock-on phenomenon, the power stream will be directed into one of the receivers at a time, under the control of control signals supplied to control nozzle 27 or 29. The fluid amplifier 18 is made up of several nozzles and passageways being provided in a solid body with no air leaks and only the openings for the power stream, the control nozzles and the output ends of the receivers being in communication with devices exteriorly of the amplifier. These passages are provided by boring, sawing, etching or molding, for example depending upon the configurations desired, the geometry and the material used. The material may be plastic, such as lucite, metal, such as brass or aluminum, or any other suitable material. Many amplifiers are made of three layers wherein the passages are present in the center layer and the outer layers are cover plates to limit the fluid flow to the plane of the operation of the fluid in the passages, and to seal the device against any fluid leakage. These amplifiers operate at frequencies far in excess of electrical or mechanical relays. The frequency range of such bi-stable fluid amplifiers extends to at least one thousand cycles per second. Bi-stable fluid amplifiers of this type are more fully discussed in the co-pending application Serial Number 58,188, filed October 19, 1960, by Raymond W. Warren and Romald E. Bowles.

In the device as shown in FIG. 2, when the turbine 12 is rotating too rapidly, the signal pulse supplied by the hole 33 being aligned with emitter 15 travels along delay loop 21 to arrive back at disc 11 at a time when slot 34 is aligned with collector 28. The signal passes through collector 28 to right control nozzle 29 in the fluid amplifier 18 to provide a control signal which directs the control power stream into receiver 24 and, thus, provides a retarding force to turbine 12, or a retarding signal to an intermediate control device should the control power stream be insufficient to control the velocity of the turbine. This retardation continues until the turbine is slowed enough that slot 32 no longer completely gets by the collector 26 and permits a signal to the fluid amplifier to increase the velocity of the turbine, and so on in repetition of the operation already set forth. The turbine and the slotted disc are mounted on an axle 30 which is operatively connected to some device for useful work, such as a grinding device or an airplane propeller.

The driving force to operate the turbine is shown in FIG. 2 as being supplied by a turbine power source 13 issuing through a passage 20 directed toward the buckets of the turbine 12. Other driving forces are anticipated by this invention, such as an internal combustion engine having a rotatable disc on a shaft for the mounting of the components of this invention that would supply a fluid amplifier with proper signalling to, in turn, control the velocity of the internal combustion engine.

The shape of the emitters, holes, delay lines, slots and collectors have been illustrated in the drawings as being circular in configuration and, in the case of the slots, circular at the ends thereof. For the optimum response for precise control and significant mass flow to the fluid amplifier control nozzles, the tubes, that is, the emitters, delay lines and collectors, should be rectangular and the holes and slots rectangular. The significant edges of the holes are the edges which approach the near edges of the emitters and the delay lines and the three approach edges should be aligned and of equal length. The other dimension of the opening for the holes need not be as large as the leading edge. The slots are arcuate with respect to the axle 30 with the leading and trailing edges radial and aligned with the leading edges of the respective delay line and collector.

In the side view of the velocity sensor and regulator as shown in FIG. 3, the relationship of the emitters 14 and 15 to holes 31 and 32, respectively, and to delay means 16 and 21, respectively, are shown. Delay means 16 and 21 can be of relatively short length to provide a rapid return for the control signal and, therefore, establish the set point at a high angular velocity. Conversely, a relatively long delay line provides a long path for the control signal to travel and a longer time for the control signal to be supplied to the fluid amplifier resulting in a lower angular velocity of the controlled device.

The sensitivity of the control device depends upon the configuration of the slots, the characteristics of the fluid amplifier, and the distance the slots are from the axle 30. For example, rectangular slots and a rectangular shaping of the emitters, delay lines and collectors are optimum as discussed above. Further, the geometry of the amplifier may be varied for specific uses, and the greater the distance the slots are from the axle the greater the sensitivity.

It is to be noted that each of the openings in the disc has a different radius from the other openings. This results in preventing spurious signals from being introduced to the delay tubes and also prevents all of the signals from being fed to all of the collectors. Also, it is to be noted that the greater the distance the collectors are from the axis 30 of the turbine, the more accurate the angular velocity of the turbine can be maintained.

Further, the emitters and collectors lie substantially along a diameter of the disc.

In operation continuous streams of fluid emanate from the emitters 14 and 15. Fluid from emitter 15 can reach delay line 21 only when hole 33 is in line with emitter 15. At this time, a fluid pulse will pass through delay line 21. The delay time of the air pulse, $t_d$, may be written as:

$$t_d = \frac{x}{V} \tag{1}$$

where $x$ is the length of delay line 21 in feet, and
$V$ is the velocity of the fluid pulse in feet per second.

During this time the disc has turned through an angle $\theta$. If the disc is turning at the desired velocity $$\theta = \omega_d t_d \tag{2}$$

at the desired velocity the system is designed so that there will not be sufficient flow to activate the bi-stable amplifier 18. Since slot 34 is positioned for the fast indication, it will not give a switching level signal until the disc has traveled more than $\theta_d$. When the disc is moving too slow, the output from the delay line 21 will fall on the solid portion of the slotted disc 11 and will not be transmitted to the amplifier 18. The slow indication through emitter 14, hole 31, delay line 16, slot 32 and collector 26 operates in a similar way to give a switching level indication whenever the disc has traveled less than desired.

Equations 1 and 2 can be combined to give $$\omega_d = \frac{\theta_d V}{x} \tag{3}$$

This system will only discriminate between angular velocities higher or lower than $\omega_d$. If it is desired to change the regulated angular velocity to $\omega_1$, the speed sensor must now discriminate between velocities above or below $\omega_1$. Equation 3 shows that the parameters which effect the speed at which regulation will take place are the delay angle, $\theta_d$, the delay length, $x$, and the pulse velocity, V. It is generally inconvenient and impractical to change the delay angle, $\theta_d$. However, it may be done by either moving the slots in the disc or repositioning the collectors and delay lines or replacing the disc with appropriately located slots and holes. The length of the delay lines, $x$, can easily be changed in stationary applications. Under airborne conditions this would be impractical. Finally, the velocity of the fluid pulse could be varied by changing the pressure of the air supply.

The bi-stable fluid amplifier gives an output error signal to slow the disc when it is turning at a rate higher than $(1+a)\omega_d$ (where $a$ is the percent accuracy required) and continues to give this output until the velocity has been reduced to $(1-a)\omega_d$. When the disc is slow, $(1-a)\omega_d$ or lower, the amplifiers gives an output error signal to speed up the disc until the velocity of the disc is increased to $(1+a)\omega_d$. This permits an oscillation of $a\omega_d$.

The fast and slow outputs 23 and 24, respectively, from the bi-stable amplifier 18 increases or reduces the velocity of the disc. Increased velocity arises from a slow indication when the output of the bi-stable amplifier supplements the driving torque. Reduced speed is accomplished from a fast indication by directing the output of the amplifier to give a torque that opposes the driving torque.

It is essential to know accurately the duration and magnitude of the input signal to the bi-stable amplifier that will cause it to change positions. It is assumed that a given mass per cycle is required for reliable switching as shown graphically in FIG. 4. Mass can accumulate as the result of signals from more than one cycle. Any mass per cycle that is insufficient to switch the bi-stable amplifier will be partially entrained away by the power jet of the amplifier 18. When the complete pulse gets through the slotted disc to the inputs, the mass per cycle, M, may be written as $$M = \frac{\rho A_c V t_s}{g} \tag{4}$$

where $\rho$ = density of fluid in pounds per cubic foot
$A_c$ = area of collectors 26 and 28 in square feet and
$t_s$ = time emitter slot is in position in seconds.

The pulse in Equation 4 has been assumed to be rectangular. The rise time of the pulse depends upon the frequency and the distance of the emitters from the axis 30 of the disc 11. At the speeds at which turbines operate, this is a very good assumption.

The mass per cycle may also be expressed in terms of angular velocity by combining Equation 4 with the expression for angular velocity, $\omega = \theta/t$.

$$M = \frac{\rho A_c V \theta_s}{g \omega} \tag{5}$$

where $\theta_s$ is the angle enclosed by the emitter slot in radians.

In order to effect a reliable switch this mass per cycle must always be greater than a constant, C, which is fixed for any particular bi-stable amplifier $$\frac{\rho A_c V \theta_s}{g \omega} > C \tag{6}$$

$\theta_s$ can be designed into the slot to satisfy this inequality. However, the accuracy is proportional to $\theta_s$.

Thus, it is seen that I have provided a very reliable and accurate velocity sensor and regulator.

In FIG. 4 is shown a graphic representation of the operation of this device. The first plot shows the mass flow of the control signal egressing from the emitters with the straight line $\rho A_c V$ representing that the mass flow per unit of time is constant at the emitters. The middle plot shows the mass flow per unit of time curve at the beginning end of the delay line for two revolutions of the disc 11 with a hole being aligned with the emitter and delay line for a time $t_s$. The period of revolution for the disc is T. The third plot shows the mass flow per unit of time at the end of the delay line as compared to the beginning with the time displacement by the delay line, $t_d$, clearly shown. In the middle plot, the slanting rise during the first pulse is the integral of the mass flow per unit time curve, and is labeled $\rho A_c V t_s$.

It will be apparent that the embodiments shown are only exemplary and that various modifications can be made in construction and arrangement within the scope of the invention as defined in the appended claims.

I claim as my invention:

1. In an on-off discontinuous control device, a rotating means, means for rotating said rotating means, means for producing a control signal, means for receiving and reproducing said control signal, means for collecting said control signal, sampling means on said rotating means for selectively applying said control signal to said means for receiving and reproducing, sensing means on said rotating means for selectively passing said control signal from said reproducing means into said collector when the velocity of said rotating means deviates from a selected rate, a velocity correcting power source, fluid amplifier means having control means therein, said correcting power source connected to said fluid amplifier, said collector means connected to said control means whereby said control means selects the correction of the velocity of the rotating means in response to control signals collected by said collector means.

2. The device as set forth in claim 1 in which said means for receiving and reproducing is a delay line, the length of which determines the frequency to be maintained by the rotating means.

3. In a fluid-operated velocity sensor and regulator, a rotatable means, means for rotating said rotatable means, a signal power source, a sensing means rotatable coupled to said rotatable means, means for providing a control signal, means for applying said control signal to said sensing means, means responsive to a preselected position of said sensing means for receiving said control signal from said sensing means and re-applying said control signal to said sensing means at a location remote from the location of applying said control signal, a collector means responsive to a preselected position of said sensing means for collecting said re-applied control signal, a fluid-operated bi-stable device, including a velocity correcting power source, opposed control nozzles and a pair of receivers to receive a velocity correcting power stream from said velocity correcting power source, one of said receivers being selected by the said stream in response to a signal pulse in one of said control nozzles, said collector means being connected to said control means to apply the control signal from said sensing means to said fluid amplifier, said receivers selectively supplying the corrective power stream to effect velocity regulation of the rotatable means.

4. In a fluid-operated device for controlling the speed of a rotating member, a source of fluid signals, speed sensing means operatively connected to said rotating member and rotatable therewith, said sensing means having first means for selectively passing said signals to a receiving and reproducing means, said sensing means having second means for selectively passing said signals from said receiving and reproducing means to a fluid amplifier when the speed of said member deviates from a predetermined rate, said amplifier controlling the speed of said member in response to said signals.

5. The control device according to claim 4 wherein said amplifier is a bistable fluid amplifier.

References Cited by the Examiner
UNITED STATES PATENTS

| | | | |
|---|---|---|---|
| 2,646,814 | 7/1953 | Mueller | 137—58 |
| 2,658,482 | 11/1953 | Harris | 137—47 X |
| 2,719,035 | 9/1955 | Morris | 137—36 |
| 2,727,525 | 12/1955 | Harris | 137—81.5 |
| 2,982,902 | 5/1961 | Le Gates | 318—481 |
| 3,111,291 | 11/1963 | Horton | 244—78 X |

WILLIAM F. O'DEA, *Primary Examiner.*

CLARENCE R. GORDON, *Examiner.*